Figure 5:
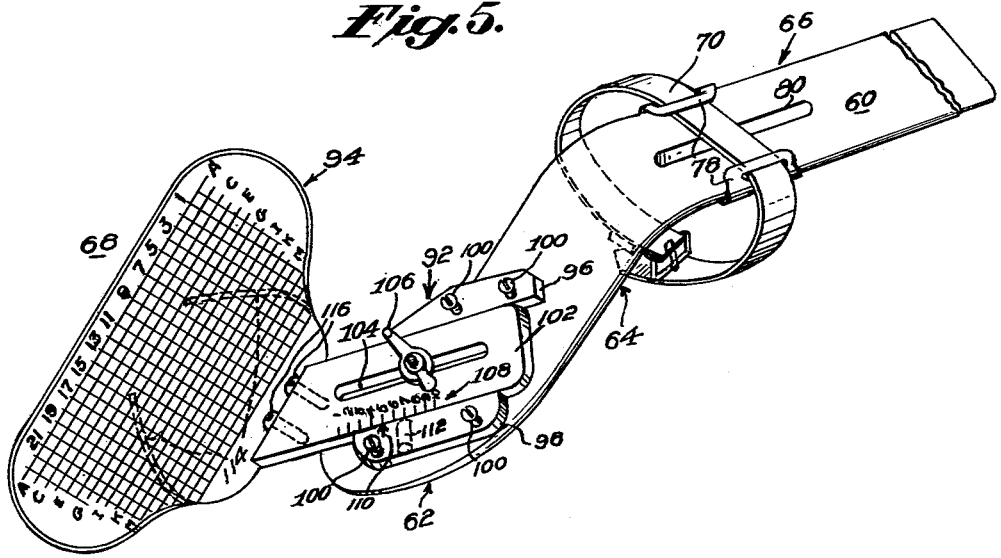

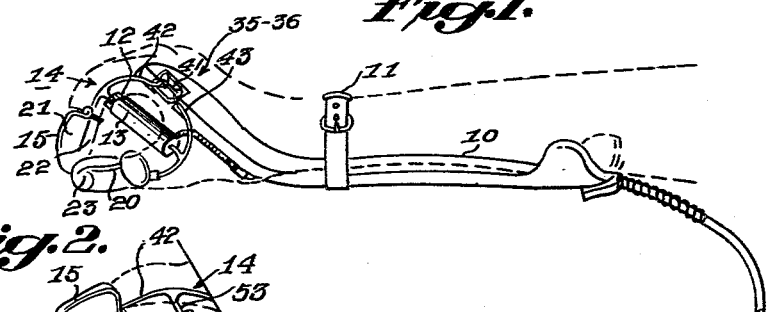
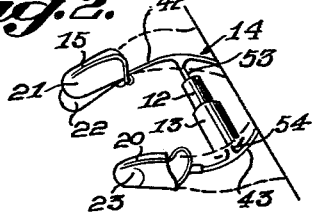
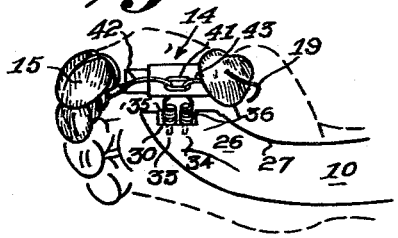
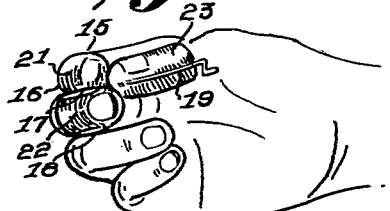
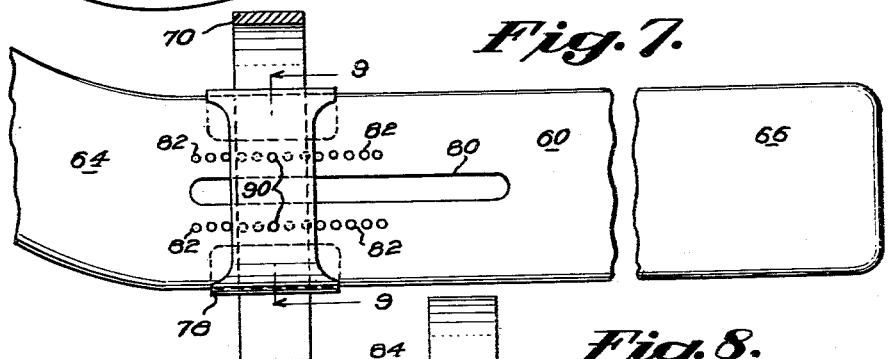
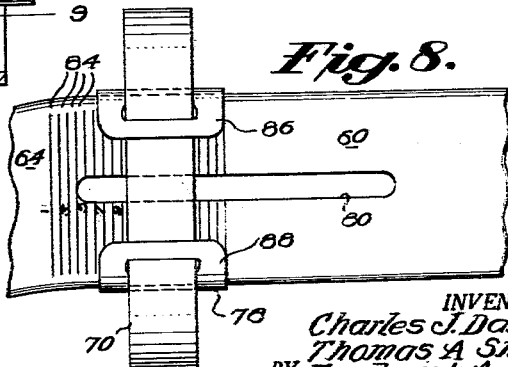
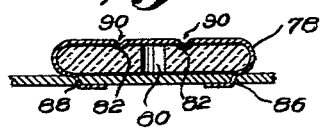

Dec. 8, 1964   C. J. DANIELS ETAL   3,159,923
HAND MEASURING MEANS FOR FITTING
MECHANICAL HANDS TO PATIENTS
Filed Jan. 27, 1961.   7 Sheets-Sheet 2

INVENTORS
Charles J. Daniels,
Thomas A. Smith,
and Frederick A. Harbin.

BY Herbert M. Birch
ATTORNEY

Dec. 8, 1964 C. J. DANIELS ETAL 3,159,923
HAND MEASURING MEANS FOR FITTING
MECHANICAL HANDS TO PATIENTS
Filed Jan. 27, 1961 7 Sheets-Sheet 3

INVENTORS
Charles J. Daniels,
Thomas A. Smith,
and Frederick A. Harbin

BY Herbert M Birch
ATTORNEY

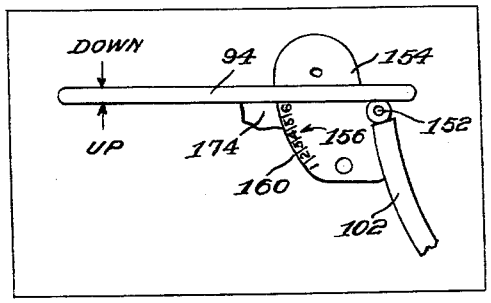
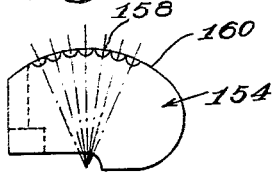
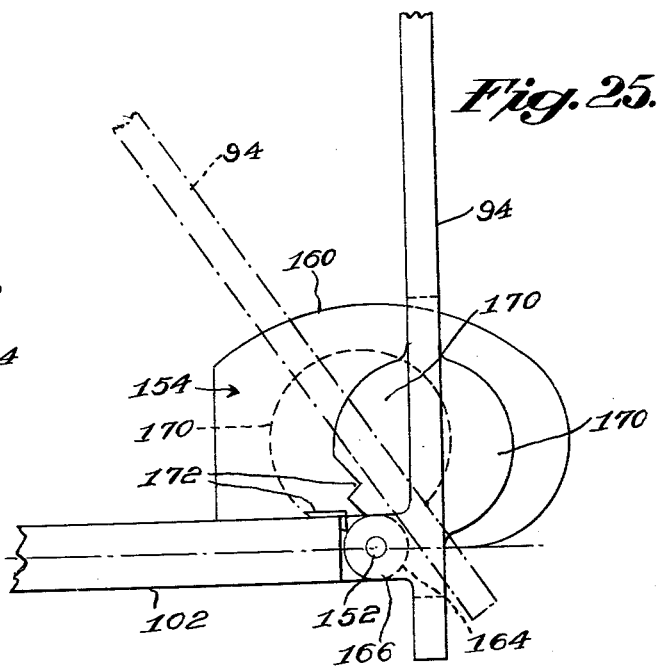

HELPING HAND
*Dimension sheet*

Patient's Name . . . . . . . . . . . . . . . . . . . . .
SEND TO:
    Address.

Date . . . . . . .

Right Hand      Left Hand

STRAPS
Mark strap hole with an X

Wrist    10   9   8   7   6   5   4

Arm    11   10   9   8   7   6   5   4

GRIP SPRING ELEVATION

Indicate with an arrow    7 6 5 4 3 2 1 8 9 10 11

GRID GRIP
Circle Thumb-index finger pressure point

A–M rows, columns 1–17

WRIST TO PALM
SETTING
Mark with an X
  — 0 —
  — 5 —
  — 10 —
  — 15 —
  — 20 —
  — 25 —
  — 30 —

*118*

*Fig.18.*

CAP SIZES
THUMB . . . INDEX . . . MIDDLE . . .

GRIP OUTLINE      FLAT INDEX FINGER    FLAT MIDDLE FINGER thumb      FLAT THUMB OUTLINE Draw line "G"      ALWAYS INDICATE JOINT CREASES Index Finger.

For left hand outlines, please use the back of this sheet.

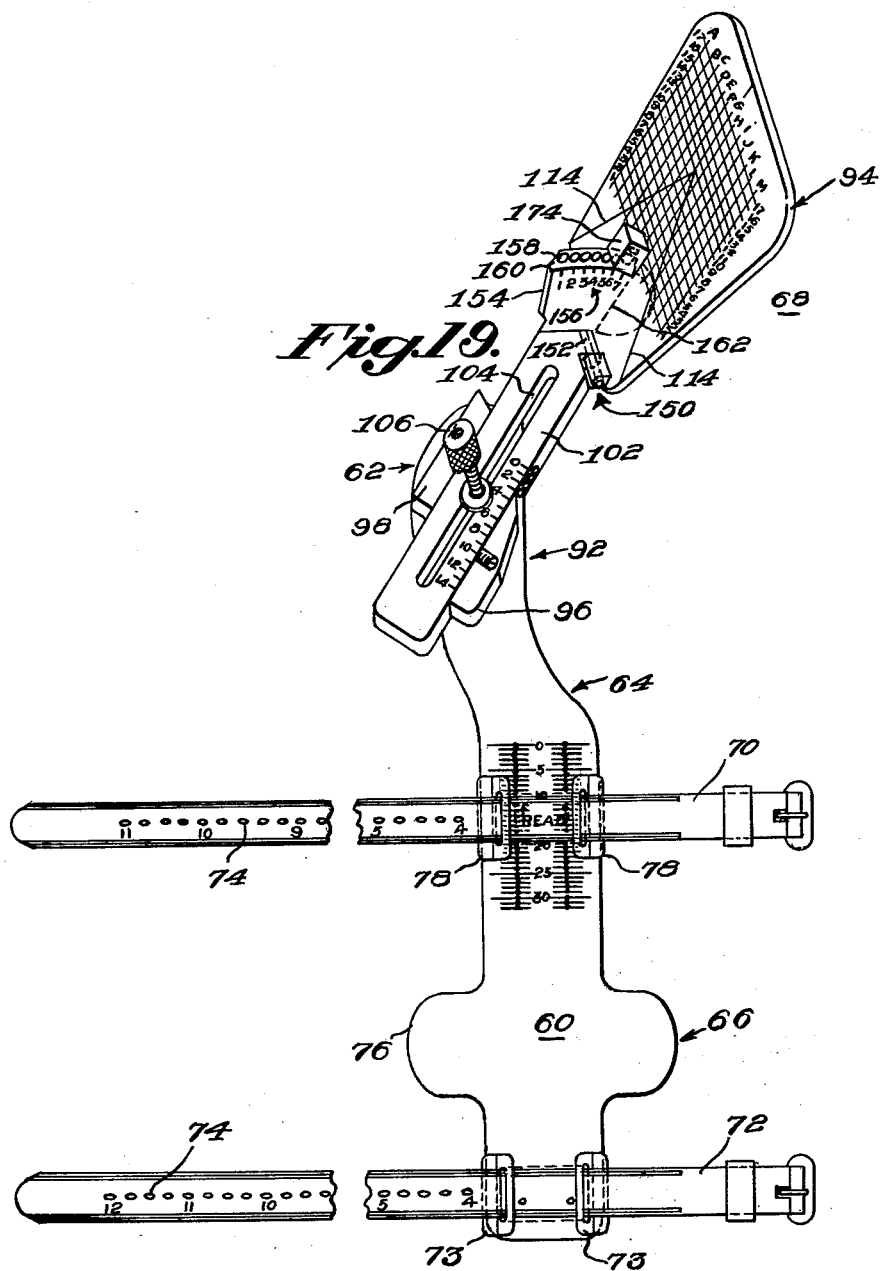

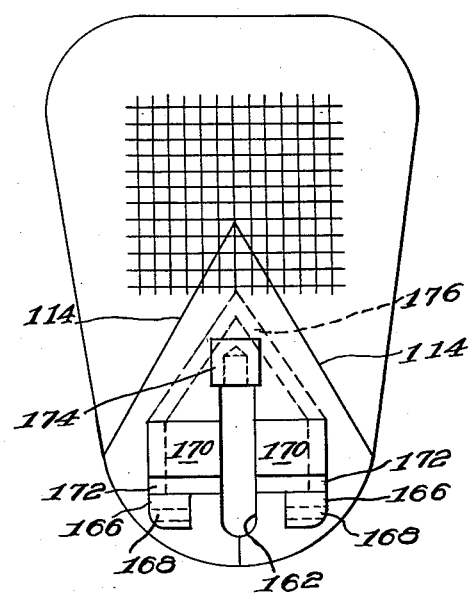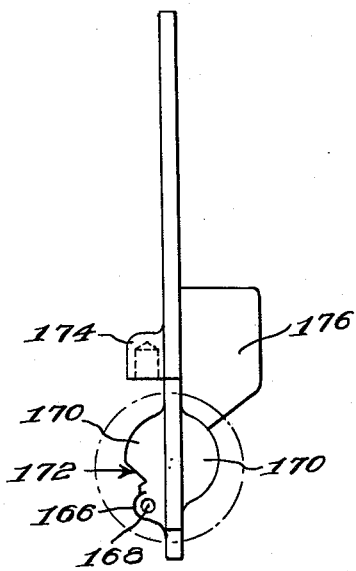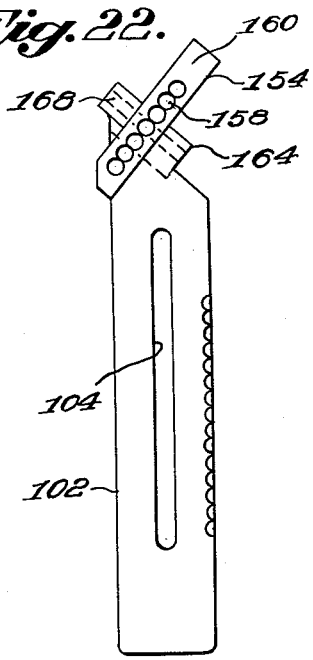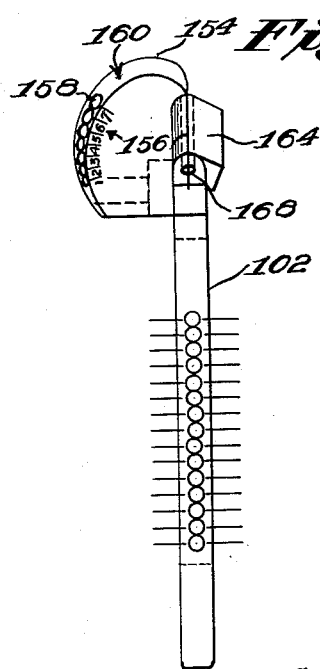

United States Patent Office 3,159,923
Patented Dec. 8, 1964

3,159,923
HAND MEASURING MEANS FOR FITTING MECHANICAL HANDS TO PATIENTS
Charles J. Daniels and Thomas A. Smith, Wilmington, Del., and Frederick A. Harbin, Glenolden, Pa., assignors to All American Engineering Company, Wilmington, Del., a corporation of Delaware
Filed Jan. 27, 1961, Ser. No. 85,252
18 Claims. (Cl. 33—174)

This invention relates to apparatus for the rehabilitation of quadriplegic patients or the like and more particularly to a means for measuring the hand of a patient to insure the proper fit of a mechanical hand such as disclosed in our copending application, "Mechanical Hand" by Charles J. Daniels and Thomas A. Smith, assigned to the present assignee.

The invention to be hereinafter described is specifically directed to the taking of measurements to properly fit a mechanical orthotic hand to the arm, wrist, palm and fingers of a quadriplegic or any other person with crippled hands which have lost their normal grip ability.

In the process of fitting a mechanical hand of the desired type to the hand of a patient, four key measurements or groups of measurements must be taken. These must be taken on a standardized basis so that efficient production and the accompanying lower cost for artificial limbs and the like may be realized.

The first of the necessary key measurements is the location of the natural grasp of the patient as determined by the natural contact point between the thumb and forefinger of the patient.

The second of the necessary key measurements is the location of the grasp center which measurement is taken along a diagonal across the palm of the hand as will be later described with respect to the structure of the grip enhancing means in the desired "Mechanical Hand." This measurement is necessary to properly position the grip enhancing means with respect to the grip location of the patient.

The third of the necessary key measurements is the location of the wrist bone with respect to the palm of the hand, as determined by the shape of the palm contacting section of the "Mechanical Hand," in order that the wrist strap necessary to properly secure the device to the wrist of the patient may be properly located.

The fourth of the necessary key measurements is the determination of wrist and forearm circumference at the proper point of location for both the wrist and forearm straps necessary to firmly secure the "Mechanical Hand" on the forearm, wrist and hand of a patient.

An additional measurement required is that of fitting finger caps to the hand of the patient at the tip of the thumb, forefinger and middle finger.

It is, therefore, a primary object of this invention to provide a single, compact measuring unit for performing all of the above enumerated key measurements.

Still another object of this invention is to provide a single, compact measuring unit for performing all of the above enumerated key measurements on a standardized basis to facilitate production of the "Mechanical Hand" and lower the cost thereof.

These and other objects of this invention will become apparent with reference to the following specification and drawings.

Figure 6:
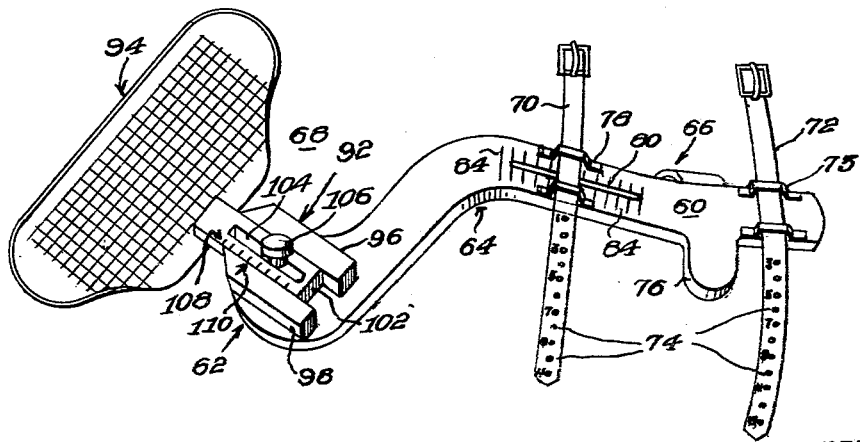
Figure 10:
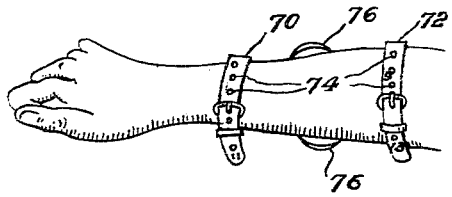
Figure 11:
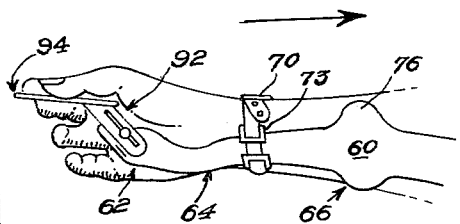
Figure 12:
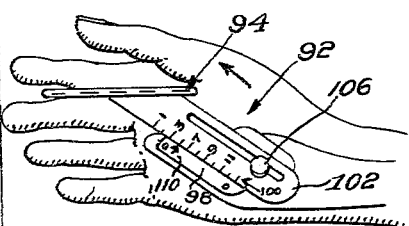
Figure 14:
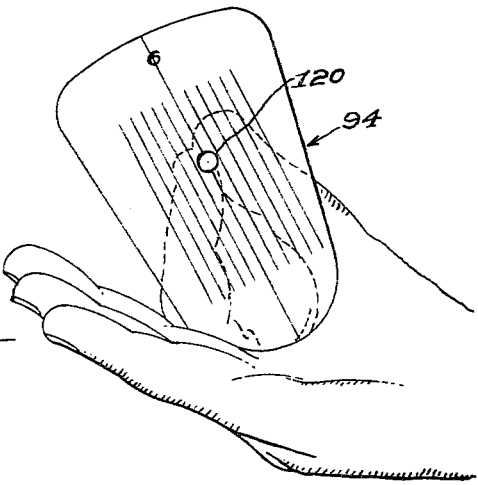
Figure 15:
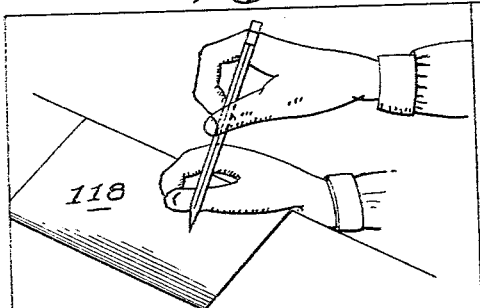
Figure 16:
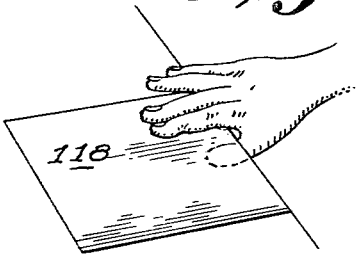
Figure 17:
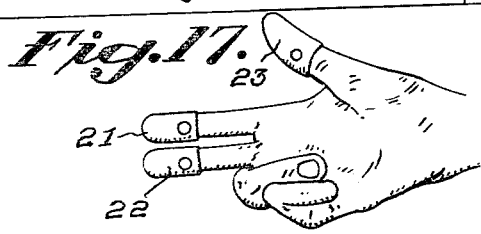

In the drawings:
FIGURE 1 is a side elevation of a "Mechanical Hand" attached to a patient with the fingers of the patient in a closed grip position;
FIGURE 2 is a partial side elevation showing the fingers of a patient energized to an open grip position;
FIGURE 3 is a partial front view of the patient's hand as shown in FIGURE 1;
FIGURE 4 is a front view of the patient's hand as shown in FIGURE 2;
FIGURE 5 is an oblique elevation of the invention;
FIGURE 6 is an additional perspective of the invention;
FIGURE 7 is a detailed bottom view of that portion of the invention as generally shown in FIGURE 11;
FIGURE 8 is a detailed top view of that portion of the invention generally shown in FIGURE 11;
FIGURE 9 is a cross-section taken along line 9—9 of FIGURE 7;
FIGURE 10 shows the means for making the fourth of the above-enumerated key measurements;
FIGURE 11 shows the means for making the third of the above-enumerated key measurements;
FIGURE 12 shows the means for making part of the second of the above-enumerated key measurements;
FIGURE 13 shows the means for making another part of the second of the above-enumerated key measurements;
FIGURE 14 shows the means for making the remaining part of the second of the above-enumerated key measurements;
FIGURE 15 shows the placing of the hand of a patient on a measurement sheet for the purpose of tracing the outline of the grip of the patient thereon;
FIGURE 16 shows the placing of the hand of a patient on a measurement sheet for the purpose of tracing the flat outlines of the thumb, index and middle fingers of the patient thereon;
FIGURE 17 shows the means for determining the size of the finger caps for the tips of the thumb, index and middle fingers of the patient;
FIGURE 18 is a showing of a hand measuring chart used in conjunction with this invention;
FIGURE 19 is a view in perspective of a preferred embodiment of the invention;
FIGURE 20 is a detail of FIGURE 19;
FIGURE 21 is a side elevation of the detail of FIGURE 20;
FIGURE 22 is a detail of FIGURE 19;
FIGURE 23 is a side elevation of the detail of FIGURE 22;
FIGURE 24 is a detail of FIGURES 19, 22 and 23; and
FIGURE 25 is a schematic operational detail of a portion of FIGURE 19.

The "Mechanical Hand" is shown in a preferred embodiment on the hand, arm and fingers of a patient in FIGURES 1, 2, 3 and 4 and will now be briefly described whereby the need for the present invention may be more clearly defined.

*Plastic Splint*

The contoured plastic splint 10, for example of acrylic plastic provides for comfort, neatness and cosmetic attractiveness to the patient. The splint lies on the volar aspect of the forearm and is transversely curved or contoured at the end along the forearm including a transversely contoured T-headed end portion for steadying the splint, see FIGURE 10.

The splint 10 curves longitudinally from the wrist portion into the palm of the patient's hand at a predetermined measured angle and to an extent for which each patient is fitted. For example, it has been determined that at an angle of approximately 40 degrees of the hand with respect to the wrist and forearm is the most desirable. This angle enhances and improves the grip or strength in a paralyzed hand when the muscles are practically useless.

The forty degree angled end 26 of the splint 10 along the thumb adjacent side edge 27 thereof is in a substantially straight line and is formed near the upwardly angled curved free end 28 thereof with a cut-out for the provision of a bottom surface 30. This surface 30 is counterbored with two spaced sockets for the reception of headed securing pins 33 and 34, respectively to thereby secure the C-spring 14 and the finger operating mechanisms carried thereby, see FIGURE 4.

Finger Actuating Spring

The finger actuating C-spring 14 comprises a C-shaped loop with a pair of spaced parallel coils 35 and 36, which both laterally extend to one side of the closed portion of the loop and which are coiled to normally bias the free ends of the arms of the C-shaped loop toward each other. These coils 35 and 36 are secured to the bottom surface 30 of the cut-out by the headed pins 33 and 34, see FIGURE 4, and the spring coils continue into the oppositely bowed portions from the end convolution of each spring and thence into a restricted portion around which is loosely mounted a link 41. This link serves to limit the arcuate arms 42 and 43 of the C-shaped spring 14 from becoming spread apart too far during actuation by the servo unit, that is, the piston 12 and cylinder 13 mounted therebetween as hereinafter described in detail.

Each free end of each arcuate arm 42 and 43 is provided with a straight projection and fixed to each projection of the C-shaped spring at predetermined or measured positions with respect to the patient's thumb and next two fingers, are pairs of tines. For example, the thumb tines 19–20 are secured to arcuate arm 43 and the next adjacent two fingers, namely the tines 15–16 for the index finger and the tines 17–18 for the next finger are secured each to respective sides of the arcuate arm 42.

The Latex Finger Caps

The latex finger caps or thimbles 21, 22 and 23 are formed with side longitudinal sockets, which receive the respective tines for the thumb and each finger. These latex caps or thimbles are preferably cemented onto the tines for permanency and are then gloved onto the thumb and respective finger tips with the arcuate arms 42 and 43 of the C-shaped spring 14 embraced by the patient's hand, as shown in FIGURES 1, 2, 3 and 4.

These finger thimbles are molded in molds or casts taken of the thumb and fingers of the patient, who will wear the present device. Thus when applied to the thumb and fingers, the same will be accurately fitted and snugly and comfortably suited to the patient.

Servo-Unit

The servo-unit, comprising the piston 12 and cylinder 13, is preferably made of nylon to provide extreme lightness in weight and also for the reason that this material is non-corrosive. The free end of the piston 12 is formed with a projection having a spherical or ball end and the opposite free end of the cylinder 13 is likewise formed with a projection having a spherical or ball end. The spherical ends each receive the round sockets (not shown) on the end of their respective projections 53 and 54, which extend inwardly toward each other from the interior sides of the arms of the C-shaped spring 14.

For example, the cylinder 13 may have a capacity of five milliliters, a one-half inch bore and a one inch maximum stroke. Also, leakage is prevented by rubber O rings between the cylinder and piston member.

The Measuring Means

Referring now to FIGURES 5 and 6, the invention is shown as comprising a contoured plastic splint 60 having a palm contacting portion 62, a contoured wrist contacting section generally indicated at 64 and a forearm contacting shank 66.

A measuring means 68 for measurement of the grip dimensions of a patient's hand is attached to the palm contacting section 62 and will be hereinafter described with reference to FIGURE 5.

The entire plastic splint 60 and grip dimension measuring means 68 are secured to the underside of the patient's forearms by means of wrist and forearm straps 70 and 72, respectively, only one being shown in FIGURE 5. Both of these straps are of the perforated buckle type, similar to conventional wrist watch straps, with the perforations 74 therein having index numbers corresponding thereto.

A flared contoured section 76 is provided in the forearm section 66 of the plastic splint 60 intermediate the retaining straps 70 and 72 whereby a more comfortable fit is experienced by the patient being measured and any side play which might be allowed by the flexible forearm strap 72 is eliminated.

The wrist strap 70 is mounted in a sliding stirrup arrangement 78 shown in detail in FIGURES 7, 8 and 9.

Referring to these figures, the contoured wrist engaging section 64 of the plastic splint 60 is shown as including a flat section having an index slot 80 cut therethrough extending longitudinally along the center line of the plastic splint 60. Parallel to both of the longitudinal edges of the index slot 80 and milled out of one face of the plastic splint 60 are a plurality of aligned stirrup indexing indentations 82 arranged in pairs at equal increments on the opposite sides of the index slot 80.

In direct correspondence with the stirrup indexing indentation 82 on the opposite face of the plastic splint 60 and perpendicular to the longitudinal edges of the index slot 80 are a plurality of enumerated calibration lines 84 for indicating on a standardized basis the properly adjusted position of the stirrup 78 and the strap 70 held therein.

The sliding double stirrup 78 is shown as comprising a generally C-shaped sheet metal structure contoured to closely fit around the plastic splint 60 in the area including the index slot 80. A pair of stirrups 86 and 88 are integrally formed with the stirrup structure on the open ends of the C. The stirrups 86 and 88 are adapted to be disposed adjacent the calibration lines 84, one on either side of the index slot 80, whereby the leading and/or trailing edge of the wrist strap 80 corresponds to the calibration lines 84 to provide an accurate determination of strap position relative to the wrist section 64 of the plastic splint 60.

The sliding double stirrup structure 78 and the wrist strap 70 carried thereby are made adjustable relative to the calibration lines 84 by a series of micrometer type click adjustments provided by a pair of detents 90 integral with the back web of the C-shaped doube stirrup 78 which operatively engage the stirrup indexing indentations 82.

The wrist strap 72 is mounted in a fixed double stirrup arrangement 73.

The Grip Measuring Means

The grip measuring means 68 comprises a grasp center locator generally indicated at 92 and a grasp locator generally indicated at 94 in FIGURES 5 and 6. The grasp locator 94 is a lettered and numbered grid on transparent plastic material for the purpose of measuring the position of the thumb and finger tip pressure centers used in the grasping act. The grasp center locator 92 is a sliding scale used to provide the location information for properly installing the C-shaped grip spring 14 (FIGURES 1, 2, 3 and 4) and servo mechanisms 12 and 13 on a mechanical hand.

As shown in detail in FIGURE 5, the grasp center locator 92 extends across the palm contacting section 62 of the splint 60 so as to lie on a diagonal extending from the heel of the patient's hand to the base of the index finger. A pair of fixed parallel guides 96 and 98 are fastened to the palm contacting section 62 of the splint 60 by means of a plurality of screws 100 or the like, parallel to the above-defined diagonal and on either side thereof.

An adjustable slide 102 is adjustably positioned between the fixed guides 96 and 98 and includes a longitudinally disposed index slot 104. The index slot 104 cooperates with a set screw 106 fixed in position with respect to the palm contacting section 62 of the plastic splint 60 whereby the slide 102 may be fixed on a desired adjusted position. A series of index marks 108 are disposed along the edge of the slide 102 adjacent the guide 98 which carries a fixed reference mark 110 thereon which provides a standard for selectively adjusting the slide 102.

As shown in FIGURE 5, one of the guides, 98 in this case, is provided with a socket 112 adapted to contain a spring loaded ball detent (not shown) for cooperating with a plurality of slide indexing indentations (not shown) on the adjacent side face of the slide 102 whereby a mircrometer type click adjustment of the slide 102 may be made.

The grasp locator 94 comprises a chart of the plane orthogonal coordinate type with the central vertical axis thereof perpendicular to the plane of the slide 102. The plane of the chart 94 is disposed parallel to the plane of the natural grip between the thumb and index finger and is located at the index finger end of the diagonal across the palm of the patient.

A pair of score marks 114 are included on the chart 94 to indicate an average grip outline whereby a technician or the like using the invention to measure a patient will be able to readily position the fingers of a partially or totally paralyzed hand to take a reading by means of the standard chart coordinator.

As shown in FIGURE 5, a pair of screws or rivets 116 are used to secure the grasp locator chart 94 to the end of the slide 102.

*The Grip Measuring Means (a Preferred Embodiment)*

Another and more preferred embodiment of the grip measuring means similar to that described above is shown in FIGURES 19, 20, 21, 22, 23, 24 and 25.

Referring to FIGURE 19, the entire measuring means is shown with the preferred grip measuring means included therein. Like numbers in FIGURE 19 refer to the corresponding parts for those numerals in FIGURES 5 and 6.

Instead of the grasp locator chart 94 being fixedly attached to the end of the adjustable slide 102, the chart 94 is shown as having a hinge connection 150 therewith, the axis 152 of the hinge being along the bias cut tip of the slide 102.

Referring in addition to FIGURES 22, 23 and 24, an indexed guide plate 154 having a arcuate profile and carrying a plurality of indices 156 is mounted integral with the end of the said slide 102. The guide plate 154 overhangs the end of the slide 102 intermediate the ends of the pivotal connection 150 and is mutually perpendicular with respect to the top surface of the slide 102 and the pivot pin or axis 152.

Each of the indices 156 correspond to a half-socket 158 formed in the curved top edge 160 of the guide plate 154. These indices provide a measure of the grip angle of a patient such that a plane juxtaposed with the inner edge of the thumb and forefinger in the gripping position may be located at the proper angle with respect to the palm to provide more comfort and gripping efficiency for the patient.

The grasp center locator chart 94 is provided with a slot 162 through which the indexed guide plate 154 is adapted to extend when the hinged connection 150 has been made between the chart 94 and the end of the slide 102. In FIGURES 20 to 23 the hinge structure is shown in detail as comprising molded beads 164 and 166 on the slide 102 and chart 94, respectively, having a matching central bore 168 through which a hinge pin or the like 152 (FIGURES 19 and 25) may be secured to complete the hinge connection 150.

An additional molded beading section 170 is provided on opposed faces of the chart 94 for the purpose of reinforcement thereof. The beading section 170 on the same face as the hinge bead 166 is provided with a flat planar face 172 cut therein at an angle such that when the chart 94 is pivoted toward the slide 102, the flat face 172 on the beading section 170 will engage the upper surface of the slide 102 to provide a limit stop for the motion of the chart 94 about the pivot or hinge pin 152. This action is clearly shown by the dotted line operational schematic of FIGURE 25.

In order that the chart 94 may be securely positioned with respect to the indices 156 and half-sockets 158, a spring-biased ball-detent and housing 174 are mounted immediately adjacent the upper end of the slot 162 on the chart 94 whereby the ball-detent (not specifically shown) engages with the half-sockets 158 to provide a click type adjustment of the angle between the adjacent faces of the chart 94 and the slide 102.

On the face of the chart 94 opposite the ball-detent and housing 174 is an inverted V-shaped ledge 176, which provides a support for the thumb and forefinger of a patient in the immediate vicinity of the general grip defining lines 114 hereinbefore described.

*The Standardized Measusement Chart*

Every measurement made by the invention must be based on some standard by which all of the measurements made can be correlated to properly dimension a "Mechanical Hand" to a particular patient.

In FIGURE 18, a standardized chart 118 is shown which in conjunction with the mechanical means of the invention provides the necessary standard of measurement. In the following description of the operation of the invention the chart 118 will also be referred to.

*The Measurements*

Referring now to FIGURES 10 through 18, inclusive, in keeping with the structure already defined in conjunction with FIGURES 5, 6, 7, 8 and 9, and FIGURES 19 through 25, the following measurements of a patient's hand are made by use of the present invention.

First, the wrist strap 70 must be properly positioned on the arm of the patient and the plastic splint 60 must then be forced in the direction of the arrow in FIGURE 11 whereby the adjustable double stirrup 78 will be forced to assume the proper position on the wrist section 64 thereof by way of the click type adjustment means defined in FIGURES 5, 6 and 7. The forearm strap 72 is then tightened as shown in FIGURE 10.

When this series of adjustments has been made, the orthotist, prothetist or technician, nurse, or physician making the adjustment refers to the standardized chart 118 and marks the corresponding numerals under the titles "Straps" and "Wrist to Palm Setting" which correspond to the numeral on the strap perforations 74 and the numeral on the calibration line 84 which correspond to the leading and/or trailing edge position of the wrist strap, respectively. This information allows the palm section 26 of the plastic splint 10 of the "Mechanical Hand" to be properly fitted to the patient.

The next measurement to be taken is that of the grasp center location which is referred to on the chart as the "Grip Spring Elevation."

With the wrist and forearm straps 70 and 72, respectively already positioned, the set screw 106 of the grasp center locator is loosened and the slide 102 is forced in the direction of the arrow in FIGURE 12 until the outer end thereof which holds the grasp locator chart 94 contacts the base of the index finger. The set screw is then tightened at this position and the reference numeral on the calibration mark 100 adjacent the reference mark 110 on the fixed guide 98 is recorded on the standardized chart 118.

This measurement permits the proper positioning of the C-shaped grip spring 14 and the mounting surface and pins 30 and 33, respectively, on the palm contacting section 26 of the "Mechanical Hand" as shown in FIGURE 4.

With the foregoing measurements having been made, the location of the pressure point 120, as shown in FIGURE 14, in the grip between the thumb and index finger of a patient, is made by placing the thumb and index finger in a gripping position on the back side of the transparent grasp locator chart 94 and reading off the co-ordinates corresponding to the position of the pressure point 120. These coordinates are located on the standardized chart 118 under the title "Grid Grip" where a chart is provided that is a replica of that on the transparent grasp locator 94 whereon a mark identifying the location of the pressure point 120 can be recorded.

Simultaneously with the measurement of FIGURE 14 the measurement generally illustrated in FIGURE 13, with respect to the preferred embodiment of the invention shown in FIGURES 19 through 25, is now made. The thumb and forefinger of the patient are placed on the ledge 176 on the back of the chart 94 and the natural pressure is permitted to pivot the chart 94 about the hinge pin or axis 152 on the end of the slide 102 until the ball detent 174 is in the proper half-socket 158 for the grip of that particular patient. The proper index number 156 read is the largest one on the indexed guide plate 154 not obscured in the slot 160 of the chart 94. This number is then recorded by indicating the corresponding number placed in the semi-circle under the title "Grip Spring Elevation" on the standardized chart 118 of FIGURE 18.

This number is the index which actually defines the angle between the end of a diagonal taken across the patient's palm axially of the adjustable slide 102 and a line intersecting the end of that diagonal parallel to the vertical coordinate lines on the chart 94.

The mechanical measuring means of the present invention is now removed from the patient and the hand of the patient is placed on the chart 118 as generally shown by FIGURES 15 and 16 whereby the outlines of the grip, the index finger, the middle finger and the thumb of the patient may be traced or outlined under the proper titles. Referring further to the grip outline, the "line 'G'," is that line tangent to the surface of both the thumb and index finger which passes through the pressure point 120 when the thumb and index finger are in a gripping position.

The final measurement is indicated in FIGURE 17 wherein a plurality of finger caps 21, 22 and 23 bearing standard size numbers are selectively fitted to the thumb, index and middle fingers of the patient. The proper size numbers are placed on the charge 118 under the title "Cap Sizes."

As can be seen from the foregoing description and drawings the invention readily provides a thorough and efficient standard of measurement for fitting orthotic limbs of the grip augmenting type to the hand of a patient.

It is to be understood that the embodiments shown and described herein are for the purpose of example only and are not intended to limit the scope of the appended claims.

What is claimed:

1. In a means for measuring the hand of a quadriplegic patient or the like for the purpose of fitting a mechanical hand thereto, a measuring device comprising a splint having portions thereof in juxtaposition with the hand, wrist and forearm of said patient, said hand engaging portion including means for measuring the grip of a patient comprising adjustable calibrated means for measuring the diagonal extending from the base of the index finger across the palm to the heel of the hand of said patient and second means on said adjustable means adjacent said index finger for measuring the location relative the end of said diagonal adjacent said index finger of the pressure point intermediate the ends of the thumb and index finger of the patient when said fingers are in gripping juxtaposition.

2. The invention as defined in claim 1 wherein said adjustable calibrated means for measuring the said diagonal comprises fixed guide means on the hand engaging portion of said splint parallel to said diagonal, an index reference mark on said guide means and a slide intermediate said guide means and adjustable relative to the said index mark along said diagonal, said slide including a plurality of enumerated calibration lines adapted to be aligned relative said reference mark to provide a measurement of said diagonal.

3. The invention as defined in claim 1 wherein said second means for measuring the location of said pressure point comprises a plane two coordinate grid defined surface mounted on said adjustable means adjacent the base of said index finger.

4. In a means for measuring the hand of a quadriplegic patient or the like for the purpose of fitting a mechanical hand thereto, a measuring device comprising a splint having portions thereof in juxtaposition with the hand, wrist and forearm of said patient, said wrist engaging portion including first adjustable means for measuring the circumference of the wrist of said patient and second adjustable means for measuring the palm to wrist bone spacing of the said patient.

5. The invention as defined in claim 4 wherein said first adjustable means comprises a strap having a plurality of calibrated perforations therein.

6. The invention as defined in claim 4 wherein said second adjustable means comprises a longitudinally disposed index slot lying along the central axis of the wrist portion of said splint, a plurality of aligned indexing indentations arranged in pairs along opposite sides of said index slot on the wrist adjacent side of said splint, a plurality of calibration lines perpendicular to the longitudinal edges of said index slot extending along said slot at intervals corresponding to the spacing of said indexing indentations on the opposite side of said splint and enumerated by said standard index numbers, a wrist strap, a sliding stirrup member mounted on said splint for holding said wrist strap with the leading and trailing edges thereof parallel to said calibration lines, and a pair of detents integral with said sliding stirrup means and engaging opposite ones of said pairs of indexing indentations whereby said splint may be moved relative to said wrist strap when said wrist strap is fixed to the wrist of said patient by a series of incremental click type adjustments provided by the cooperation between said detents and said indexing indentations.

7. A measuring kit for measuring the hand of a quadriplegic patient or the like for the purpose of fitting a mechanical hand thereto including a chart having a plurality of key measurements represented thereon by a plurality of standardized index numbers and including means thereon for recording the actual shape and size of the fingers of the said hand of the patient; and a measuring device adapted to be attached directly to the forearm of the patient in juxtaposition with the hand of said patient for determining the remaining measurements for fitting said hand with a mechanical hand, said measuring device including means for cocking the hand of said patient at an angle of forty degrees with respect to the wrist of said patient, means for determining the index corresponding to the palm to wrist bone spacing of the patient, means for determining the index corresponding to the length of the diagonal taken from the base of the index finger to the heel of the palm of the patient, means for determining a pair of coordinate indices corresponding to the position relative the end of the said diagonal adjacent said index finger of the pressure point intermediate the ends of the thumb and index finger of the patient when said fingers are in gripping juxtaposition, means for determining an index corresponding to the angle of intersection of the plane defined by the thumb and index finger of the patient in gripping position with the plane defined by the palm of of the patient and means for determining a pair of indices corresponding to the circumferential dimensions of the wrist and forearm, respectively, of said patient.

8. The invention as defined in claim 7 wherein said means for determining a pair of coordinate indices corresponding to the position relative the end of the said diagonal adjacent said index finger of the pressure point intermediate the ends of the thumb and index finger of the patient when said fingers are in gripping juxtaposition comprises a transparent plate having a coordinate enumerated grid thereon with the central vertical axis thereof perpendicular to the end of said diagonal adjacent said index finger and the central horizontal axis thereof parallel to the plane of the grip formed between said thumb and said index finger.

9. The invention as defined in claim 7 wherein said means for cocking the hand of said patient at an angle of forty degrees with the wrist of the patient comprises a transparent plastic splint having palm, wrist and forearm engaging sections adapted to be fastened to the volar aspect of the patient's forearm by means of a pair of wrist and forearm encircling straps, respectively.

10. The invention as defined in claim 9 wherein said means for determining the index corresponding to the palm to wrist bone spacing of the patient comprises a longitudinally disposed index slot lying along the central axis of the wrist portion of said splint, a plurality of aligned indexing indentations arranged in pairs along opposite sides of said index slot on the wrist adjacent side of said splint, a plurality of calibration lines perpendicular to the longitudinal edges of said index slot extending along said slot at intervals corresponding to the spacing of said indexing indentations on the opposite side of said splint and enumerated by said standard index numbers, a wrist strap, a sliding stirrup member mounted on said splint for holding said wrist strap with the leading and trailing edges thereof parallel to said calibration lines, and a pair of detents integral with said sliding stirrup means and engaging opposite ones of said pairs of indexing indentations whereby said splint may be moved relative to said wrist strap when said wrist strap is fixed to the wrist of said patient by a series of incremental click type adjustments provided by the cooperation between said detents and said indexing indentations.

11. The invention as defined in claim 9 wherein said means for determining the index corresponding to the length of the diagonal taken from the base of the index finger to the heel of the palm of the patient comprises means adjustably mounted on the palm engaging section of said splint along said diagonal including a pair of guides having a fixed index mark thereon, a slide mounted between said guides adjacent said fixed index mark having a plurality of calibration lines thereon, and a click type adjustment means between said slide and said guides for providing an incremental adjustment of said slide from one calibration line to another with respect to said fixed index mark.

12. The invention as defined in claim 9 wherein said means for determining a pair of indices corresponding to the circumferential dimensions of the wrist and forearm, respectively, of said patient comprises a wrist strap and a forearm strap located on said splint at the wrist engaging and the outer end of said forearm engaging portions thereof, respectively, each of said straps having a plurality of adjustment perforations therein enumerated by a like plurality of standard indices.

13. In a means for measuring the hand of a quadriplegic patient or the like for the purpose of fitting a mechanical hand thereto, a measuring device comprising a splint having portions thereof in juxtaposition with the hand, wrist and forearm of said patient, said hand engaging portion including means for measuring the grip of a patient comprising adjustable calibrated means for measuring the diagonal extending from the base of the index finger across the palm to the heel of the hand of said patient, second means on said adjustable means adjacent said index finger for measuring the location relative the end of said diagonal adjacent said index finger of the pressure point intermediate the ends of the thumb and index finger of the patient when said fingers are in gripping juxtaposition and third means comprising an indexed connection between said first means and said second means for measuring the angle of intersection of the plane defined by the thumb and index finger of the patient in gripping position with the plane defined by the palm of the patient.

14. The invention as defined in claim 13 wherein said adjustable calibrated means for measuring the said diagonal comprises fixed guide means on the hand engaging portion of said splint parallel to said diagonal, an index reference mark on said guide means and a slide intermediate said guide means and adjustable relative to the said index mark along said diagonal, said slide including a plurality of enumerated calibration lines adapted to be aligned relative said reference mark to provide a measurement of said diagonal.

15. The invention as defined in claim 13 wherein said second means for measuring the location of said pressure point comprises a plane two coordinate grid defined surface mounted on said adjustable means adjacent the base of said index finger.

16. The invention as defined in claim 15 wherein said third means comprises a fixed planar calibrated guide means mounted on said adjustable calibrated means at the end of said diagonal and extending perpendicular to and through said grid defined surface of said second means, pivot means connecting said second means to said adjustable calibrated means, and cooperating indexing means on said fixed planar guide means and said second means whereby said grid defined surface may be selectively positioned with respect to said fixed guide means.

17. In a means for measuring the hand of a quadriplegic patient or the like for the purpose of fitting a mechanical hand thereto, in combination, adjustable calibrated means for measuring the diagonal extending from the base of the index finger across the palm to the heel of the hand of said patient including a calibrated planar slide movable along said diagonal; second means including a plane two coordinate grid defined surface mounted on the end of said slide adjacent said index finger in a position such that when the index finger and thumb of a patient are in a gripping position, both of these members are juxtaposed with said grid defined surface; and calibrated mounting means for said second means for pivotally connecting said second means to said slide whereby the angle of intersection of the plane of said slide and said grid defined surface may be ascertained for each individual patient as a measure of the angle of the general plane of the grip with the plane of the palm of the patient's hand.

18. The invention defined in claim 17 wherein said calibrated mounting means comprises a fixed calibrated planar guide member mounted adjacent the end of said slide in overlapping relationship therewith and perpendicular to the plane of said slide, hinge means extending along the end face of said slide with the axis thereof perpendicular to the plane of said calibrated guide member for adjustably retaining said second means on said slide, said second means having a cut-out portion in the grid defined planar section thereof for straddling said calibrated guide means, index numerals on said guide means for indicating the position of said planar section with respect to said slide, and cooperating index means on said guide means and on said planar section for retaining said planar section in any selected position about said hinge axis with respect to said guide means and said slide.

References Cited by the Examiner

UNITED STATES PATENTS

| | | | |
|---|---|---|---|
| 308,684 | 12/84 | McDonald | 33—179 |
| 1,069,086 | 7/13 | Johnson | 33—2 |
| 1,590,499 | 6/26 | Cozad | 33—174 |
| 1,997,920 | 4/35 | Bliss | 33—2 |
| 2,554,285 | 5/51 | Westbrook | 33—3.6 |
| 2,605,548 | 8/52 | Clarke | 33—2 |
| 2,667,159 | 1/54 | Goldberg et al. | 33—179 X |
| 2,767,708 | 10/56 | Keropian | 128—77 |
| 2,832,334 | 4/58 | Whitelaw | 128—77 X |

ISAAC LISANN, *Primary Examiner*.

ROBERT B. HULL, *Examiner*.